UNITED STATES PATENT OFFICE.

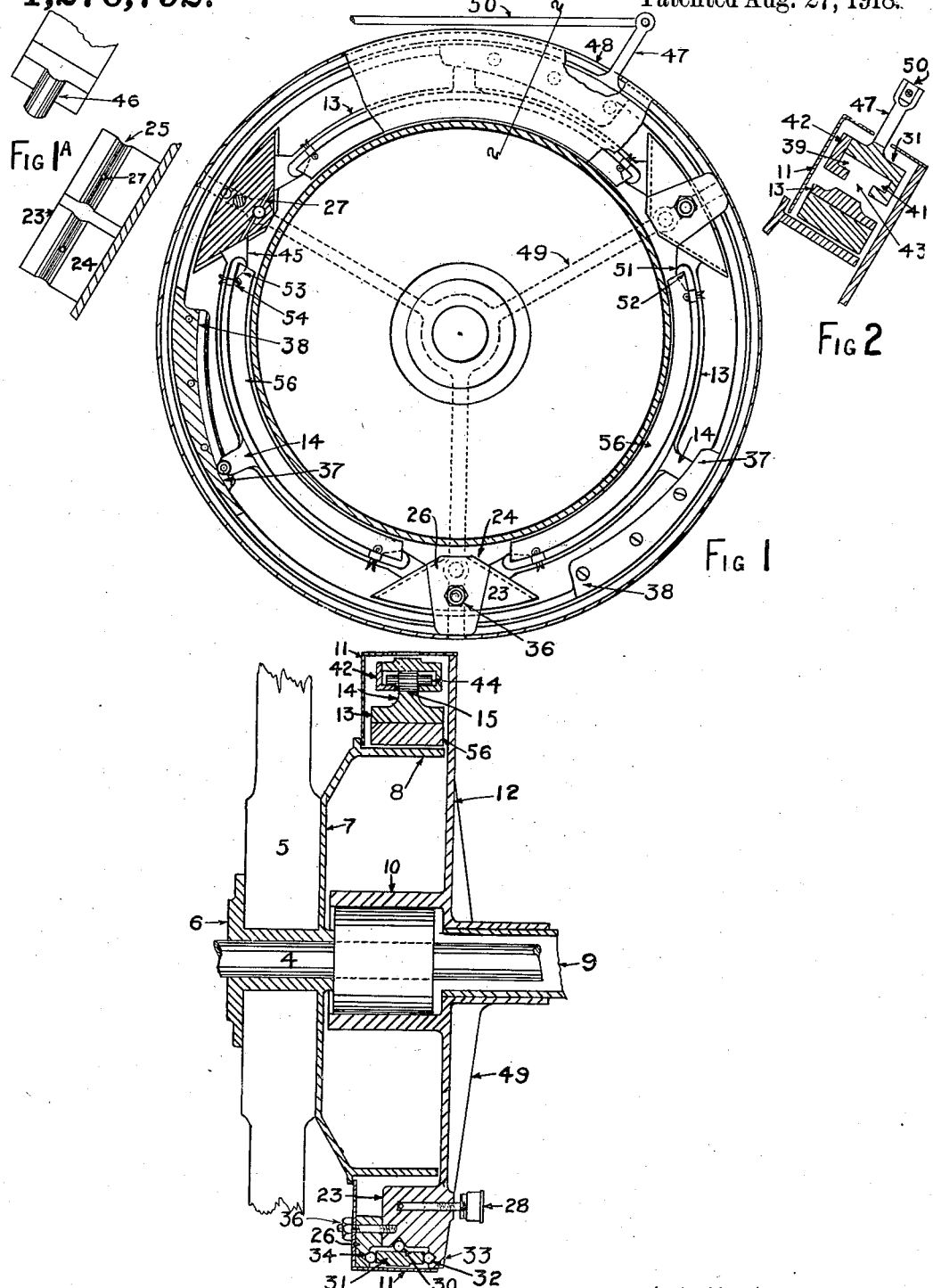

THOMAS ROY MORSE, OF BEXLEY, NEAR SYDNEY, NEW SOUTH WALES, AUSTRALIA.

BAND-BRAKE.

1,276,792.  Specification of Letters Patent.  Patented Aug. 27, 1918.

Application filed November 15, 1917. Serial No. 202,180.

*To all whom it may concern:*

Be it known that I, THOMAS ROY MORSE, a subject of the King of Great Britain, residing at "Esrom," Harrow Road, Bexley, near Sydney, in the State of New South Wales and Commonwealth of Australia, licensed surveyor, have invented a new and useful Improvement in Band-Brakes, of which the following is a specification.

This invention relates to such brakes as those wherein a stationary band of two hinged parts is compressed or tightened upon a drum. And it has been specially devised in order that the band divided in this case into a plurality of sector parts will be forced in complete arcs practically wholly around upon the drum periphery and so more effectually brake the latter.

But in order that this invention may be easily carried into practical effect and to enable the manner in which it is to be performed to be clearly understood a preferred and most serviceable construction of a brake according thereto will now be described with reference to the drawings accompanying and forming part of this complete specification.

Figure 1 is an elevation partly in section of a brake according to this invention removed from the revolving element but showing the brake drum in section. Fig. 1ª shows enlarged face views of the ends of the stationary bearing bracket and of the foot or slipper end of the sector-shoe. Fig. 2 is an enlarged section on line 2—2 in Fig. 1 and Fig. 3 is a simplified central sectional elevation of the whole.

In this construction of brake the revolving element fast on the shaft or axle 4 is a wheel 5 whose boss 6 has a disk 7 terminating in a flange 8 which is the brake drum. The wheel axle casing 9 which of course is stationary has a journal bearing 10 for the shaft 4 and a disk or frame or cover plate 12 to close the drum space (which may be utilized for an internal brake) and to extend concentrically beyond the brake drum 8 and so provide an exterior space for the brake such space having thereover it a flanged dust cover 11.

Exteriorly of the drum are three sector-shoes or brake-block holders 13 each having an outwardly radial medial shank 14 whose end carries a roller 15 adapted to engage as hereinafter described with an eccentric cam of the pressure ring.

Circumferentially between each sector-shoe 13 and integral with the disk or cover plate 12 are internally overhanging brackets 23 having bearing faces 24 each formed with a longitudinally extending concave race 25, and a grease duct 27 communicating with said faces 24 from a lubricator 28 exteriorly of the disk 12.

Circumferentially around the outer sector peripheries of the bearing brackets 23 and on balls 30 in cone recesses in such peripheries is a part-revoluble pressure ring 31 which has on one edge balls 32 bearing in a cone recess in shoulder 33 on disk or cover plate 12 and has on the other edge balls 34 bearing on cone recesses in the face of cover plates 26 each secured by a stud and a nut 36 and dowel pins to bearing brackets 23.

Circumferentially between each bearing bracket 23 in the pressure ring 31 and internally presented is an eccentric cam track from 37 to 38 having side recesses or wards 39 and 41 formed by an internal wall 40 and by a screwed-on keeper ring 42 respectively which leave a circular slot 43 between them. In these wards 39 and 41 are the pintle ends 44 of the bearing roller 15 homed in the end of shank 14 of a sector-shoe 12 while through the slot 43 between the wall 40 and keeper ring 42 the main body of the roller 15 has action against the inner face of the eccentric cam track 37 to 38.

Each end 45 of each sector-shoe 12 has a foot or slipper face 46 complementary to and with the bearing face 24 of the bearing bracket 23 and adapted to slide thereon in and out radially that is parallel to the radial movement of the sector-shoe 12 and to govern the direction of that movement.

A stem 47 extrudes through a sector slot 48 in the dust cover 11 which is secured say by screws to the cover plate 26 and the ends of said slot 48 form the stops to the rotation of the pressure ring 31. Clear of the webs 49 of cover plate 12 this stem 47 is jointed to a pull rod 50 leading to an appropriate control gear or handle.

Each sector-shoe has hook or overhanging ends 51 with dovetail or undercut internal faces 52 and with flush flanges or stops 53 on one face of said sector-shoes and lugs for cotter pins 54 on the other face to retain the brake blocks 56 in place after they have been slid transversely within the dovetail ends 52.

While the shaft 4 and wheel 5 is free to revolve the leading end 37 of the eccentric cam by means of the pintle ends 44 of roller 15 in the wards 39 and 41 keeps the sector-shoes 13 with brake blocks 56 just clear of the external periphery of the brake drum 8.

To apply the brake the pull rod 50 is actuated to partially revolve the pressure ring 31 so that on each radial shank 14 the face of one eccentric cam presses inwardly as said ring rotates forwardly from 37 toward 38 acting as a wedge and thrusting by means of roller 15 and shank 14 its sector-shoe radially inwardly and causing the blocks 56 to grip the drum 8 in a complete arc as each said shoe 13 is guided by its feet or slippers 46 in or on the bearing faces 24 (parallel to said shank 14) of the bearing brackets 23. The rod 50 may be pulled as quickly or as slowly as also as more or less strongly as desired for the necessary force to suddenly or to gradually apply the brake the full arc grip of the blocks being insured by the true radial movement of the sector-shoes 13. The movement of the pressure ring 31 is reversed to release the brake the return of the eccentric cam toward 37 drawing the sector-shoes 13 and blocks 56 by action of the wards 39 and 41 on the pintle rollers 44 to normal position free of the drum surface:—

What I claim is:—

1. A brake comprising a revolving drum, sector-shoes disposed exteriorly of said drum, a shank formed on each sector-shoe for guiding the same during its movement, a ring supported for partial rotation, cams formed on said ring and adapted to engage said shanks for moving said shoes inwardly or outwardly toward or away from said drum, and means for actuating said ring.

2. A brake comprising a revolving drum, a stationary disk inclosing said drum, sector-shoes arranged exteriorly of said drum and adapted to engage the same, radially extending shanks formed on said shoes, feet formed on the ends of said shoes and having faces parallel with the respective shanks, bearing brackets on said disk and slidably receiving said feet, a movable ring, cams on said ring and engageable with said shanks, and means for partially rotating said ring.

3. A brake comprising a revolving drum, relatively stationary shoes mounted exteriorly of said drum and capable of occupying two extreme positions, one position in which they engage said drum and another in which they are disengaged with respect to said drum, a ring encircling said drum and supported for partial rotation, said ring being capable of occupying two extreme positions, and means interposed between said shoes and ring whereby said shoes will be caused to occupy one extreme position or the other according as said ring occupies one position or the other.

4. A brake comprising a revolving drum, sector-shoes arranged exteriorly of said drum and adapted to engage the same, feet formed on the ends of said shoes, brackets between the ends of said shoes having bearing surfaces for said feet, the said bearing surfaces of each bracket being parallel to those of adjacent brackets, a movable ring exteriorly of said shoes, and means carried by said ring and engageable with said shoes for moving the latter radially.

In testimony whereof I have signed my name to this specification in the presence of two subscribing witnesses

THOMAS ROY MORSE.

Witnesses:
PERCY NEWELL,
I. EASTON.